United States Patent [19]

Jenneman et al.

[11] Patent Number: 5,337,820
[45] Date of Patent: Aug. 16, 1994

[54] INJECTION OF SCALE INHIBITORS FOR SUBTERRANEAN MICROBIAL PROCESSES

[75] Inventors: Gary E. Jenneman; J. Bennett Clark, both of Bartlesville, Okla.

[73] Assignee: Phillips Petroleum Company, Bartlesville, Okla.

[21] Appl. No.: 994,870

[22] Filed: Dec. 22, 1992

[51] Int. Cl.$^5$ .................................................. E21B 43/22
[52] U.S. Cl. .................................. 166/246; 166/273; 166/274
[58] Field of Search ............... 166/246, 279, 273, 274

[56] References Cited

U.S. PATENT DOCUMENTS

| | | | |
|---|---|---|---|
| 3,032,472 | 5/1962 | Hitzman | 195/3 |
| 3,703,928 | 11/1972 | Fulford | 166/279 X |
| 4,450,908 | 5/1984 | Hitzman | 166/246 |
| 4,460,043 | 7/1984 | Thompson et al. | 166/246 |
| 4,475,590 | 10/1984 | Brown | 166/246 |
| 4,522,261 | 6/1985 | McInerney et al. | 166/246 |
| 4,534,412 | 8/1985 | Dovan et al. | 166/295 |
| 4,552,217 | 11/1985 | Wu et al. | 166/270 |
| 4,558,739 | 12/1985 | McInerney et al. | 166/246 |
| 4,610,302 | 9/1986 | Clark | 166/246 |
| 4,732,680 | 3/1988 | Weaver et al. | 210/610 |
| 4,799,545 | 1/1989 | Silver et al. | 166/246 |
| 4,800,959 | 1/1989 | Costerton et al. | 166/246 |
| 4,905,761 | 3/1990 | Bryant | 166/246 |
| 4,906,575 | 3/1990 | Silver et al. | 435/253.6 |
| 4,941,533 | 7/1990 | Buller et al. | 166/252 |
| 4,947,932 | 8/1990 | Silver et al. | 166/246 |
| 4,971,151 | 11/1990 | Sheehy | 166/246 |
| 4,979,564 | 12/1990 | Kalpakci et al. | 166/273 |
| 4,991,652 | 2/1991 | Hoskin et al. | 166/270 |
| 5,018,577 | 5/1991 | Pardue et al. | 166/279 |
| 5,083,611 | 1/1992 | Clark et al. | 166/246 |
| 5,211,237 | 5/1993 | Faircloth et al. | 166/279 |

Primary Examiner—George A. Suchfield
Attorney, Agent, or Firm—Cynthia L. Stokes

[57] ABSTRACT

A novel process for sustaining microbial activity in subterranean formations which comprises introducing as a microbial nutrient, a scale inhibitor. This process may include the sequential injection of sources of individual nutrient components which are deficient in said subterranean formation, whereby the injected phosphorus source is selected from the group consisting of an organic phosphate and an organic phosphonate.

11 Claims, No Drawings

INJECTION OF SCALE INHIBITORS FOR SUBTERRANEAN MICROBIAL PROCESSES

This invention relates to the use of scale inhibitors as nutrients in a method for sustaining microbial activity in subterranean formations.

BACKGROUND

In many subterranean microbial processes, nutrient selection and injection are controlling factors to successful operations. The microorganisms utilized must be nutritiously sustained and metabolically active and thus able to achieve their specific objective.

Numerous microorganisms suitable for achieving various microbial objectives in subterranean formations are known in the art. In order to achieve a specific microbial objective, suitable microorganisms can be selected and injected into the subterranean formation. Oftentimes, however, endogenous microorganisms well suited for achieving a particular microbial objective are already present within the formation.

Recently, a method was disclosed by Clark, et al. (U.S. Pat. No. 5,083,611 assigned to Phillips Petroleum Company), which overcame many problems associated with microbial nutrient injection methods then known to the art. This newly disclosed method provides for the sequential injection into a subterranean formation of sources of individual nutrient components which are deficient in the subterranean formation so that a complete nutrient medium capable of sustaining substantial microbial activity is formed in the subterranean formation upon injection of the last nutrient source. Each of the nutrient sources is comprised of at least one of the deficient individual nutrient components. Further, each of the nutrient sources, up to and including the next to the last nutrient source injected, is injected in an amount such that at least one individual nutrient component contained therein is retained in the subterranean formation in an amount sufficient for achieving the desired in-situ microbial objective.

The above method prevents the excessive utilization and depletion of nutrient components by microorganisms located in the vicinity of the borehole and also takes advantage of chromatographic retention in order to achieve nutrient media distribution beyond the proximity of the borehole. However, it has been discovered and disclosed by the present application, that in order to achieve biomass production (i.e. microbial growth and-/or exopolymer production) to plug high permeability zones within subterranean formations, a specific phosphorus source when used in the method of U.S. Pat. No.5,083,611 exhibits greater plugging potential than others presently used. The phosphorus source of the present invention is a scale inhibitor which is used in combination with a carbon source, and provides for an unexpected increase in a capacity for the desired biological activity, due to the ability of said phosphorus source to be more easily transported as well as its ability to remain stable during exposure to high temperatures. The ability of the nutrients to be transported in-depth is therefore of great importance. Some problems associated with the use of known phosphorus sources such as inorganic phosphates is their tendency to complex with divalent cations within the reservoir which results in poor solubility and heightened difficulty in transport distal to the wellbore. Also, inorganic polyphosphates hydrolyze at higher temperatures which render them less soluble in hard brines characterized by such temperatures. Thus, the specific use of scale inhibitors as the phosphorus source in the above method, significantly contributes to the art of practicing said method.

It is therefore an object of this invention to provide a phosphorus source for use in the state-of-the art nutrient injection for subterranean microbial processes which provides for greatly enhanced transportability and thermal stability of the phosphorus nutrient.

These and other objects of the present invention will become apparent upon inspection of the disclosure and the claims herein provided.

SUMMARY OF THE INVENTION

In accordance with the present invention, we have discovered that when injected as the phosphorus source in subterranean microbial processes, phosphorus-containing scale inhibitors are more readily transportable than those known in the art and are thermally stable, thus allowing biological activity plugging to be achieved.

A process is therefore provided for sustaining microbial activity in subterranean formations which comprises introducing as a microbial nutrient, a scale inhibitor.

DETAILED DESCRIPTION

The phosphorus nutrient injection system disclosed herein can generally be used in conjunction with any process wherein microbial activity is induced in a subterranean formation. Examples of such processes include microbial enhanced oil recovery, (MEOR) processes used in oil-bearing subterranean formations, and bioremediation processes used in aquifers. Typical microbial enhanced oil recovery processes include those wherein microorganisms are used to alter subterranean formation permeability and those wherein microorganisms are used for in-situ generation of chemicals useful for enhanced oil recovery. Examples of in-situ generated chemicals include water-soluble polymers, surfactants, solvents such as ethanol and acetone, acids, carbon dioxide, etc.

The present inventive nutrient combination of a scale inhibitor and a carbon source is particularly well suited for use in conjunction with MEOR processes for improving the volumetric sweep efficiency of subterranean formations. Oil-bearing subterranean formations contain porous rock with heterogenous zones of permeability. Water, used to mobilize oil in a waterflood, preferentially invades the high permeability zones due to these zones' decreased resistance to flow. This causes large reserves of oil, contained in the lower permeability regions, to be bypassed. In microbial enhanced oil recovery processes, nutrients are fed to microorganisms located in high permeability formation zones. The nutrients stimulate the microorganisms and cause the microorganisms to generate an increased biomass. This increased biomass results from cell growth and/or the biological production of polymer(s). Once the high permeability formation zones have been plugged, water is diverted to the previously uninvaded low permeability zones and thereby displaces oil contained in the low permeability zones.

The microorganisms used in conjunction with the present invention are selected for the attainment of a desired microbial objective and then injected into the subterranean formation. Preferably, such microorganisms when used, are injected into the formation prior to nutrient injection. As known in the art, the particular microorganisms chosen for injection should be tolerant of the conditions, e.g., temperature, pH, salinity etc., existing in the formation. Microorganisms can be injected into subterranean formations using methods which are well known in the art. The preferred microorganism injection method will depend upon the microorganism(s) chosen, and the specific characteristics of the formation. Oftentimes, endogenous microorganisms capable of achieving a desired microbial objective are already present within the subterranean formation. In order to cause the microorganisms within a subterranean formation, whether endogenous or injected, to produce a desired in-situ result, deficient nutrient components are injected into the formation which facilitates the regulation of where, in the formation, a complete nutrient package is formed and hence microbial activity occurs. Deficient nutrient components are those individual nutrient components which are needed by the microorganisms for achievement of a desired microbial objective and which are not already present within the formation in amounts sufficient for achieving the microbial objective. Subterranean formations are typically deficient in either phosphorus, nitrogen, or carbon nutrients, or combinations thereof. Suitable phosphorus sources and nitrogen sources (e.g., ammonium-containing compounds such as ammonium chloride, nitrates such as potassium nitrate, and organic nitrogen sources such as amino acids and peptides), as well as carbon sources (e.g., fats, proteins, simple carbohydrates and complex carbohydrates), and other nutrient sources which are suitable for use in nutrient injection methods are well known in the art. However, selection of a phosphorus source which is sufficiently deficient in carbon and nitrogen and which causes increased in-situ biomass production at depths of penetration where plugging is most desirable is extremely beneficial in the practice of the above method. The inventive use of scale inhibitors as the phosphorus source results in an unexpected increase in microbial activity at desired plugging sites due to the ability of the scale inhibitor to be easily transported and to maintain a high thermal stability.

The term scale inhibitor as used herein refers, to a phosphorus-containing compound capable of inhibiting scale formation in an aqueous solution. A common problem encountered in industrial activities involving transport of water or transport of aqueous mixtures is the formation of scale on equipment, particularly on the inside surfaces of conduits. Oil field brines, sea water and most commercial water contain a variety of alkaline earth metal cations, such as calcium, barium and strontium, as well as a variety anions such as bicarbonate, carbonate, sulfate, phosphate and silicate. When such ions are present in sufficient concentrations, they tend to combine to form precipitates. Scale is therefore formed by the deposition of any of several types of such precipitates, and thus tends to coat surfaces in contact with water.

Although a wide variety of materials inhibit scale formation, the compounds most commonly used in well treatments are organic phosphates or phosphonates, adducts of acrylic acid or the like. Some of these compounds which are known for their ability to inhibit scale formation have been unexpectedly found to be excellent phosphorus nutrient sources for microbial organisms existing in subterranean formations. The scale inhibitors of the present invention are those compounds selected from the groups comprising organic phosphates and organic phosphonates.

The term organic phosphate as used herein, refers to any compound or mixture of compounds containing the general molecular structure of phosphoric or polyphosphoric acid namely, $[(HO)_3PO]_n$, in which at least one hydrogen atom is replaced by an organic residue; and n is a number from 1 to about 10. Thus, the organic phosphate of the present invention can either originate as a monophosphoric acid or a polyphosphoric acid in which the phosphoric acid residues are covalently linked e.g.

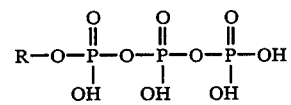

The organic residues include alkyl groups, and preferred organic residues are those having the carbon content of 1 to about 17 carbon atoms per molecule. Organic residues are linked to the phosphorus atom via an ester bond. Examples of appropriate organic residues include but are not limited to methyl, ethyl, butyl, carbohydrate, protein, peptide and lipids. The term organic phosphonate as used herein, refers to any compound or mixture of compounds containing a derivative of the general formula $[HP(O)(OH)_2]$. These phosphonate compounds incorporate a carbon linkage attached directly to the phosphorus rather than through an oxygen atom:

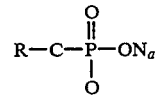

The organic residues include alkyl groups, and preferred organic residues are those having the carbon content of 1 to about 17 carbon atoms per molecule.

The carbon source to be used in combination with a scale inhibitor phosphorus source should be in a substantially phosphorus-nutrient-free solution. Also, the scale inhibitor should be in a substantially carbon-nutrient-free solution, i.e., a solution sufficiently deficient in carbon to render it unusable as a carbon source by the targeted microorganisms. This is to avoid achieving a complete nutrient combination and thus microbial activity prior to locating the nutrients in a position in the subterranean formation where microbial activity is most desired. Therefore it is advantageous to first inject a phosphorus solution of the scale inhibitor which is more readily retained in the subterranean formation and thereafter inject a substantially phosphorus-nutrient-free carbon solution. This permits deep penetration of the phosphorus prior to the injection of the carbon source which has less retainability in the subterranean formation. The carbon nutrient solution, being substantially phosphorus free will ultimately catch up to the previously injected phosphorus solution and form a complete nutrient combination deep within the subterranean formation. Microbial activity will occur where a complete nutrient combination exists and thus where such activity is most desired. Such method is well suited for enhancing oil recovery from oil-bearing subterranean formations.

The following example has been provided merely to illustrate the practice of the invention and should not be read as to limit the scope of the invention or the appended claims in any way.

EXAMPLES

EXAMPLE I

The following example relates to the use of phosphorus-containing, scale inhibitors as sources of phosphorus necessary for biological growth.

All tests were performed with field brine collected from a skimmer tank at the tract 5 tank battery located at the North Burbank Unit, Osage County, Oklahoma. Burbank brine is typical of many highly mineralized, oil-reservoir brines in that a large percentage of the solids are sodium and calcium salts (Table 1). The temperature of the brine under reservoir conditions is between 40° and 45° C. which is moderate for many oil reservoirs. Brine samples were collected in glass bottles pre-incubated in an anaerobic glove box to remove oxygen. Bottles were capped with a butyl rubber septum. The septum was penetrated with a 22 gauge hypodermic needle attached to a ¼ inch (ID) nylon tubing that was used to transmit the brine sample into the bottle. Bottles of brine were transported back to the lab the same day and placed in the anaerobic glove box.

TABLE 1

Chemical Analysis of Injection Brine from the Tract 5 Tank Battery at the North Burbank Unit

| Analyte | Concentration (g/L) |
|---|---|
| ammonium | .033 |
| nitrate | <.005 |
| nitrate | <.005 |
| sulfate | .020 |
| phosphate | <.050 |
| total organic carbon | .025 |
| calcium | 6.290 |
| barium | .755 |
| magnesium | 1.250 |
| sodium | 31.000 |
| chloride | 63.000 |
| iron | .0168 |
| total dissolved solids | 127.300 |

Biological Screen

The screens were performed by adding 100 mL of unfiltered Burbank brine to sterile, 120 mL serum bottles. Additions were made in anaerobic glove box to prevent contamination by oxygen. Glucose was added at a final concentration of 0.1 percent and a phosphorus-containing, scale inhibitor as listed in Table 2, was added as 100 microliters of 10 percent solution of the SI made up in distilled water. The bottles were stoppered with butyl rubber stoppers and incubated at 45° C. for two weeks. After this incubation, the bottles were sampled and bacterial numbers determined as acridine orange direct counts (AODC). The growth obtained when stimulated with glucose was compared with growth that occurred when stimulated with glucose and sodium trimetaphosphate (STMP) or no phosphate addition at all. The scale inhibitor compound was considered to support growth if it could stimulate an increase in bacterial numbers comparable to that obtained by using glucose plus STMP. The results in Table 2 show that scale inhibitor tested supported growth similar to that of STMP. Therefore phosphorus-containing scale inhibitor can serve as effective sources of phosphate for biological growth when compared to the more commonly used inorganic phosphates.

TABLE 2

Biological Activity of Various Commercial, Phosphorus-Containing, Scale Inhibitors

| Scale Inhibitors | Manufacturer | Type | AODC $(\times) 10^8$ |
|---|---|---|---|
| "SP-307" | Petrolite | OPE | 1.2 |
| "SP-276" | Petrolite | OPE | 1.3 |
| "VISCO 4988" | Nalco | PHO | 1.3 |
| "VISCO 4787" | Nalco | PHO | 1.0 |
| STMP | Sigma | IPE | 1.0 |
| No Phosphorus | | | 0.01 |

OPE: Organic phosphate ester;
IPE: Inorganic phosphate ester;
PHO: phosphonate

That which is claimed is:

1. A process for sustaining microbial activity in subterranean formations which comprises introducing as a microbial nutrient, a compound suitable for inhibiting scale formation in aqueous environments and selected from the group consisting of organic phosphates and organic phosphonates.

2. The process of claim 1 wherein said subterranean formation is an oil-bearing subterranean formation and said process is used to enhance oil recovery.

3. In a process of injecting microbial nutrients into a subterranean formation comprising the step of sequentially injecting sources of individual nutrient components which are deficient in said subterranean formation, the improvement which comprises using as a phosphorus source, a compound suitable for inhibiting scale formation in aqueous environments and selected from the group consisting of organic phosphates and organic phosphonates.

4. In a process for sustaining microbial activity in subterranean formations comprising the steps of injecting a substantially carbon-nutrient-free first nutrient solution comprising a phosphorus nutrient source into said subterranean formation and thereafter, injecting a substantially phosphorus-nutrient-free second nutrient solution comprising a carbon nutrient source into said subterranean formation, the improvement which comprises using as said phosphorus nutrient source a compound suitable for inhibiting scale formation in aqueous environments and selected from the group consisting of organic phosphates and organic phosphonates.

5. The process of claim 4 wherein said compound suitable for inhibiting scale formation comprises a monophosphoric acid, having the general formula $(HO)_3PO$ in which at least one hydrogen atom is replaced by an organic residue selected from an alkyl group.

6. The process of claim 5 wherein said alkyl organic residue is selected from the group consisting of those alkyl organic residues having from 1 to about 17 carbon atoms per molecule.

7. The process of claim 4 wherein said compound suitable for inhibiting scale formation comprises a polyphosphoric acid of the general formula $[(HO)_3PO]_n$ in which at least one hydrogen atom is replaced by an organic residue selected from an alkyl group.

8. The process of claim 7 wherein said polyphosphoric acid has the general formula $[(HO)_3PO]_n$ and $n$ is a number from 1 to about 10.

9. The process of claim 7 wherein said alkyl organic residue is selected from the group consisting of those alkyl organic residues having from 1 to about 17 carbon atoms per molecule.

10. The process of claim 4 wherein said compound comprises an organic phosphonate.

11. The process of claim 10 wherein said organic phosphonate is a derivative of the general formula $[HP(O)(OH)_2]$.

* * * * *